US012725909B2

(12) United States Patent
Ghajar et al.

(10) Patent No.: US 12,725,909 B2
(45) Date of Patent: Sep. 1, 2026

(54) MESHED PATCH ANTENNA ARRAY

(71) Applicant: Google LLC, Mountain View, CA (US)

(72) Inventors: Mohammad Reza Ghajar, Redwood City, CA (US); Eddie Charles Burgess, Chicago, IL (US); Ali Molaei, Chicago, IL (US)

(73) Assignee: Google LLC, Mountain View, CA (US)

( * ) Notice: Subject to any disclaimer, the term of this patent is extended or adjusted under 35 U.S.C. 154(b) by 67 days.

(21) Appl. No.: 18/851,997

(22) PCT Filed: Oct. 27, 2023

(86) PCT No.: PCT/US2023/078054

§ 371 (c)(1),
(2) Date: Sep. 27, 2024

(87) PCT Pub. No.: WO2025/090092

PCT Pub. Date: May 1, 2025

(65) Prior Publication Data

US 2025/0273845 A1 Aug. 28, 2025

(51) Int. Cl.
*H01Q 1/22* (2006.01)
*H01Q 1/24* (2006.01)
*H01Q 9/04* (2006.01)

(52) U.S. Cl.
CPC ......... *H01Q 1/2266* (2013.01); *H01Q 9/0407* (2013.01)

(58) Field of Classification Search
CPC .... H01Q 1/2266; H01Q 1/243; H01Q 9/0407; H01Q 21/065; H01Q 21/28
See application file for complete search history.

(56) References Cited

U.S. PATENT DOCUMENTS

| | | | |
|---|---|---|---|
| 11,696,390 | B2 | 7/2023 | Han et al. |
| 2017/0317418 | A1 | 11/2017 | Garcia et al. |
| 2019/0103682 | A1 | 4/2019 | Thai et al. |

(Continued)

FOREIGN PATENT DOCUMENTS

EP 3614493 A1 2/2020

OTHER PUBLICATIONS

Baccouch et al., “Design-of-a-Compact-Meshed-Antennas-for-5G-Communication-Systems”, retrieved from https://www.researchgate.net/publication/33964 4197_Design-of-a-Compact-Meshed-Antennas-f or-5G-Communication-Systems, Oct. 2019, 6 pp.

(Continued)

*Primary Examiner* — Hoang V Nguyen
(74) *Attorney, Agent, or Firm* — Shumaker & Sieffert, P.A.

(57) ABSTRACT

An example mobile computing device includes a main logic board (MLB); a first antenna array positioned on the MLB and configured to transmit signals in a first direction, the first antenna array comprising one or more planes; and a second antenna array positioned on the MLB and configured to transmit signals in a second direction, the second, direction being different than the first direction, the second antenna array comprising one or more planes and the second direction being different than the first direction, wherein at least one of the one or more of the planes in the first antenna array or at least one of the one or more of the pianos in the second antenna array comprises a meshed patch structure.

11 Claims, 5 Drawing Sheets

(56) References Cited

U.S. PATENT DOCUMENTS

| | | | |
|---|---|---|---|
| 2019/0288377 | A1 | 9/2019 | Ying et al. |
| 2019/0305429 | A1 | 10/2019 | Ying et al. |
| 2019/0334241 | A1 | 10/2019 | Han et al. |
| 2019/0363458 | A1 | 11/2019 | Park et al. |
| 2020/0021015 | A1 | 1/2020 | Yun et al. |
| 2020/0144711 | A1 | 5/2020 | Lee et al. |
| 2020/0203834 | A1 | 6/2020 | Asaf et al. |
| 2020/0313300 | A1* | 10/2020 | Ying .................... H01Q 9/0421 |
| 2021/0098882 | A1 | 4/2021 | Paulotto et al. |
| 2021/0296759 | A1 | 9/2021 | Kim et al. |
| 2021/0367357 | A1 | 11/2021 | Jia |
| 2021/0391645 | A1 | 12/2021 | Seo et al. |
| 2023/0139460 | A1 | 5/2023 | Woo et al. |
| 2023/0282959 | A1 | 9/2023 | Yeon et al. |
| 2023/0307817 | A1 | 9/2023 | Hwang et al. |

OTHER PUBLICATIONS

Rohit Khandekar et al., "Gain enhanced mm-wave dipole patch antenna with an end-fire radiation for 5g applications", retrieved from: https://ieeexplore.ieee.org/abstract/document/10 047806, Dec. 2022, 4 pp.

International Search Report & Written Opinion from PCT Application No. PCT/US2023/078054 dated Apr. 8, 2024, 14 pp.

* cited by examiner

MESHED PATCH ANTENNA ARRAY

BACKGROUND

Computing devices such as mobile computing devices, tablets, and the like may include antennas to transmit signals using wireless protocols such as $5^{th}$ generation (SG) millimeter wave (MM wave) protocols.

SUMMARY

Electronic devices, such as mobile computing devices (e.g., phones, tablets, etc.), with 5G MM wave capabilities may need to meet spatial coverage requirements stated by third-generation partnership project (3GPP) and carrier requirements. In some examples, such requirements may be met with designs having at least two antenna arrays facing different directions (e.g., to enhance coverage). Some of such designs may utilize multiple phase array integrated circuits (IC) and multiple antenna in package (AiP) modules. A mobile computing device having at least two antenna arrays facing different directions with different multiple phase array ICs and multiple AiP modules may face high insertion losses at 24 to 40 GHz frequency range. Such high insertion losses may be undesirable. In addition, the AiP modules in these designs may connect to the mobile computing device's main logic board (MLB) through a cable to bring power and radio frequency (RF) signals to the AiP modules for up/down-conversion and amplification, which may lead to increased cost (e.g., cost of cable) and/or signal loss as signals are transmitted through a respective cable.

In accordance with one or more aspects of this disclosure, a mobile computing device may include a plurality of antenna arrays that each include a plurality of planes (e.g., a ground plane and/or a patched plane), with at least one plane of the plurality of planes of at least one antenna array being formed by a meshed patch structure. The meshed patch structure may include a plurality of vias and traces arranged in a mesh-like structure. The mobile computing device may further comprise an integrated circuit (e.g., a single IC) configured to drive the plurality of antenna arrays.

Utilizing the aforementioned mesh patch structure may provide various advantages. As one example, by utilizing such a meshed patch structure, the first antenna array and/or the second antenna array to be positioned directly on an MLB. Positioning antenna arrays on the MLB may be desirable because an IC on the MLB may drive the antenna arrays to transmit signals with reduced RF interconnection components (e.g., which may reduce cost, improve performance, and/or provide for simpler construction). As another example, the meshed patch structure may enable the plurality of antenna arrays to use the same IC to drive the transmission of signals (e.g., as opposed to using a dedicated phase array IC and cables for each respective antenna array). In this way, aspects of this disclosure may reduce insertion losses, enhance coverage and/or reduce costs to produce a mobile computing device.

In one example, a mobile computing device includes a main logic board (MLB); a first antenna array positioned on the MLB and configured to transmit signals in a first direction, the first antenna array comprising one or more planes; and a second antenna array positioned on the MLB and configured to transmit signals in a second direction, the second direction being different than the first direction, the second antenna array comprising one or more planes and the second direction being different than the first direction, wherein at least one of the one or more of the planes in the first antenna array or at least one of the one or more of the planes in the second antenna array comprises a meshed patch structure.

The details of one or more examples are set forth in the accompanying drawings and the description below. Other features, objects, and advantages of the disclosure will be apparent from the description and drawings, and from the claims.

DETAILED DESCRIPTION

Figure 1:
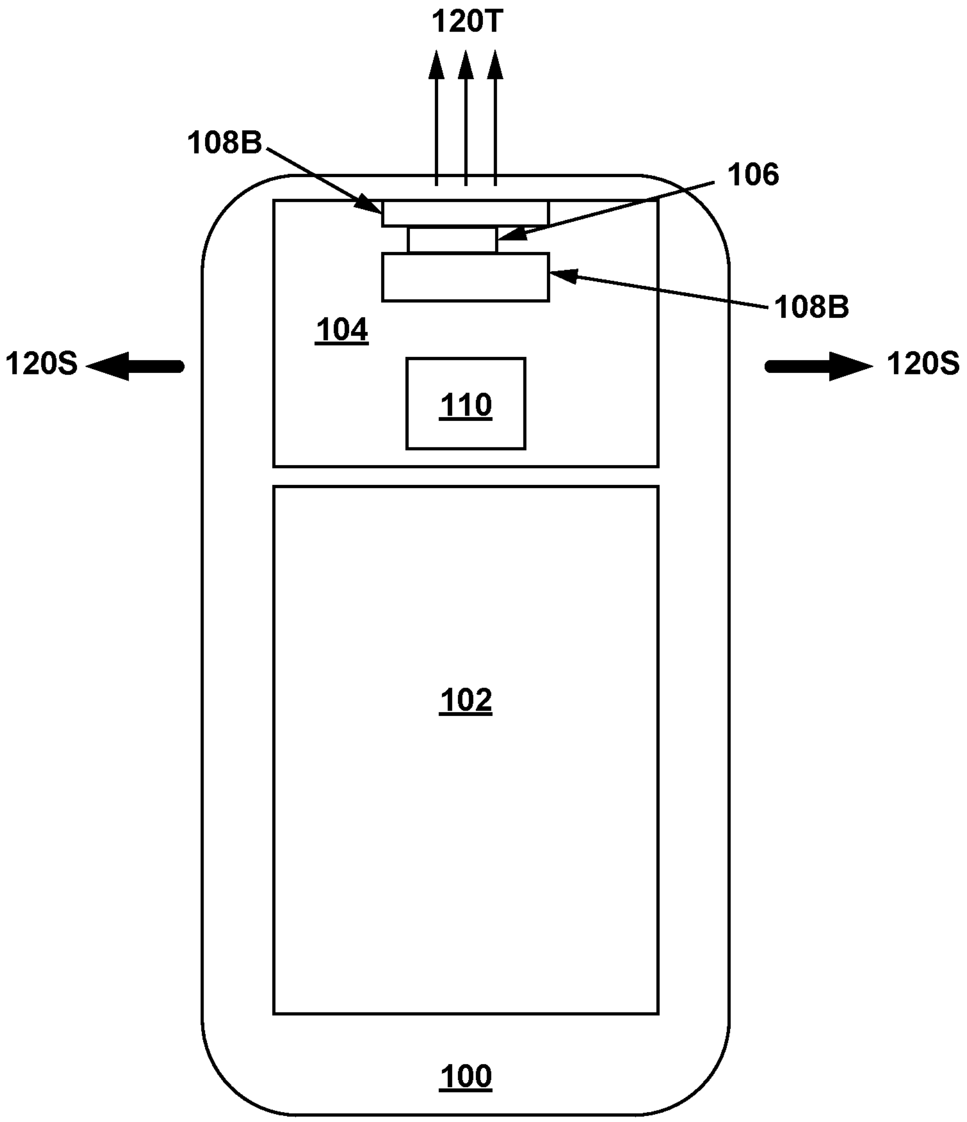
FIG. 1 is a schematic view of an example computing device 100, in accordance with one or more aspects of this disclosure.

FIG. 1 is a schematic view of an example computing device 100. Examples of computing device 100 include a mobile phone, a tablet computer, a laptop computer, a wearable device (e.g., a computerized watch, computerized eyewear, computerized headphones, computerized gloves, etc.), a home automation device or system (e.g., an intelligent thermostat or home assistant device), a gaming system, a media player, an e-book reader, a mobile television platform, or any other type of mobile, wearable, and non-wearable computing device. Computing device 100 may be an individual mobile computing device.

In some examples, computing device 100 may have 5G MM wave capabilities. Computing device 100 may include one or more of a battery 102, main logic board (MLB) 104, an IC 106, a first antenna array 108A, a second antenna array 108B, and/or a transceiver 110. The IC 106, first antenna array 108A, and second antenna array 108B may be positioned on the MLB 104. In some examples, MLB 104 may comprise one or more layers. For example, one or more of the first antenna array 108A, and second antenna array 108B may be soldered on the MLB 104. IC 106 may be configured to operate as a shared IC, such as a shared phase array IC, to drive transmission of signals via the first antenna array 108A and the second antenna array 108B. For example, as shown in FIG. 1, a top direction 120T and a side direction 120S, are shown in FIG. 1. A back direction (e.g., perpendicular to a back of computing device 100) would be perpendicular to the top direction 120T and the side direction 120S. A side direction 120S may be one or more of a left-side direction or right-side direction. For example, a side direction 120S is perpendicular to top direction 120T and the back direction.

The first antenna array 108A may be positioned at a first position of the MLB 104, such as a position at or near a surface of the MLB 104 that faces in a top direction 120T. In some examples, the second antenna array 108B may be positioned at a second position at or near a surface of the MLB 104, such as a position at or near a surface of the MLB 104 that faces in a back direction, the back direction extending out of the page of FIG. 1. For example, first antenna array 108A may be configured to operate as a top transmitting antenna array that is configured to transmit signals in a top direction 120T and second antenna array 108B may be configured to operate as a back transmitting antenna array that is configured to transmit signals in a back direction, the back direction extending out of the page of FIG. 1. In some examples, first antenna array 108A and second antenna array 108B may be referred to as antenna system 108. In some examples, first antenna array 108A may be configured to operate as a side transmitting antenna array that is configured to transmit signals in a side direction 120S and second antenna array 108B may be configured to operate as a back transmitting antenna array that is configured to transmit signals in a back direction. In some examples, second antenna array 108B may be configured to operate as a side transmitting antenna array that is configured to transmit signals in one side direction 120S. In some examples, the first antenna array 108A may comprise a meshed patch structure, as discussed below. In some examples, the second antenna array 108B may comprise a meshed patch structure. In some examples, the first antenna array 108A and the second antenna array 108B may each comprise meshed patch structures.

Battery 102 may store electrical power and providing the stored electrical power to other components of computing device 100. Examples of battery 102 include, but are not limited to, lithium-ion, a nickel-cadmium, nickel-metal hydride, lead acid, and lithium-ion polymer batteries. In some examples, battery 102 may include a single battery. In other examples, battery 102 may include multiple batteries (e.g., to increase capacity and/or due to internal geometry). Battery 102 may, in some examples, be generally a rectangular prism having a top, sides, and a bottom.

While FIG. 1 shows computing device 100 having an antenna system including one or more of first antenna array 108A or second antenna array 108B, computing device 100 may have multiple antenna systems. The computing device 100 may be, for example, a smartphone, tablet, laptop, smartwatch or other mobile computing device, or may be any other computing device that may include multiple radios and antenna systems for communication over different wireless links. For example, a smartphone may include a 5G NR radio, a 4G LTE radio, and a Wi-Fi radio. The 5G radio may include an antenna system including one or more antenna arrays 108 for use in two frequency ranges, frequency range 1 (FR1) which may include sub-6 GHz frequency bands, and frequency range 2 (FR2), which may include bands above 24 GHz including frequencies in the mm Wave band.

Figure 2:
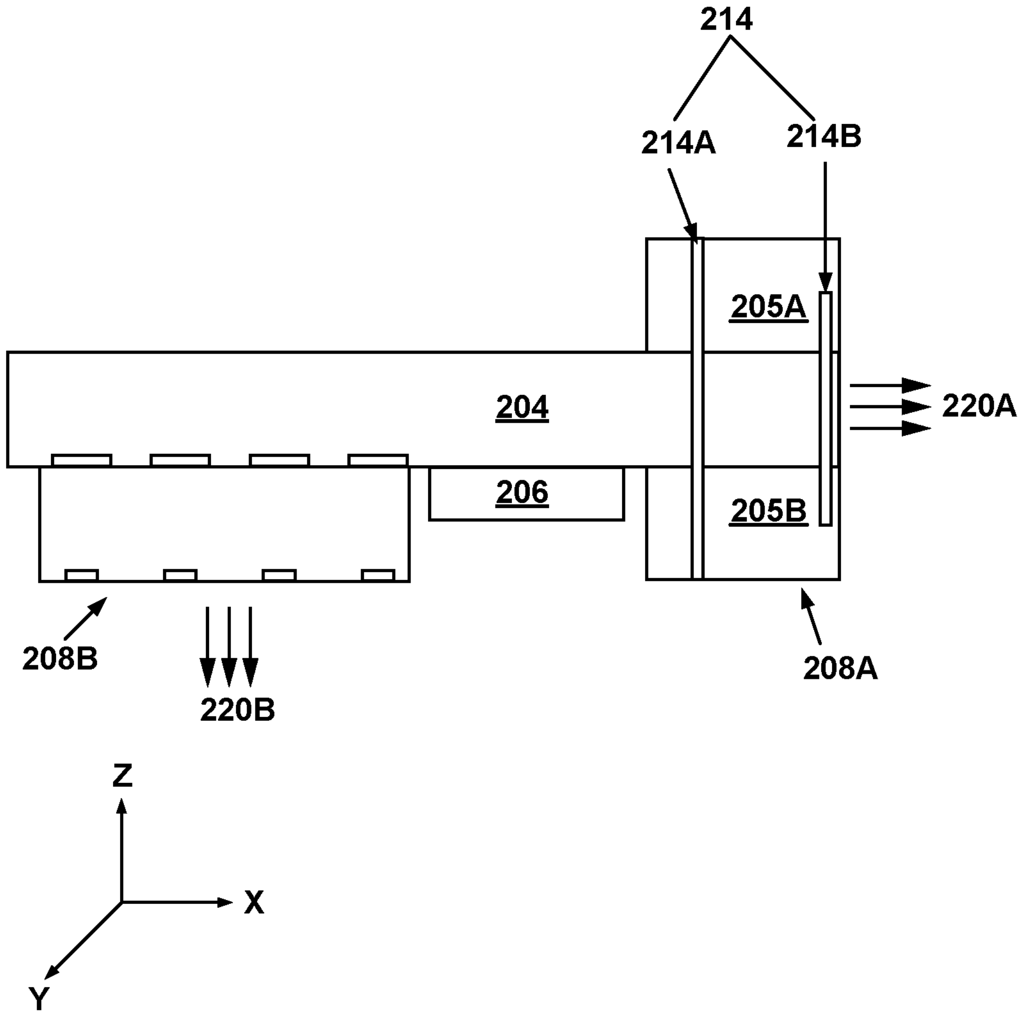
FIG. 2 is a schematic view of an example main logic board and antenna arrays, in accordance with one or more aspects of this disclosure.

FIG. 2 is a schematic view of an example configuration of MLB 204, an IC 206, a first antenna array 208A, and a second antenna array 208B of a computing device, such as computing device 100 shown in FIG. 1. MLB 204 is one example of MLB 104 shown in FIG. 1, IC 206 is one example of IC 106 shown in FIG. 1, first antenna array 208A is one example of first antenna array 108A shown in FIG. 1, and second antenna array 208B is one example of second antenna array 108B shown in FIG. 1. The first antenna array 208A may include one or more planes 214, such as a ground plane 214A and a patch plane 214B. In some examples, one or more planes 214 of first antenna array 208A may be substantially planar type of plane. In some examples, the second antenna array 208B may also include one or more planes 214, such as a ground plane and a patch plane shown in the first antenna array 208A. FIG. 2 shows an example of a first substrate 205A on a first side (e.g., above) of the MLB 204 and a second substrate 205B on a second side (e.g., below) of the MLB 204. In some examples, one or more of the ground plane 214A and the patch plane 214B of the first antenna array 208A may be positioned on the MLB 204 and on one or more of the first substrate 205A or the second substrate 205B. Positioning one or more of the planes 214 having a meshed patch structure on MLB 204 and on one or more of the first substrate 205A or the second substrate 205B may be desirable because the IC 206 on the MLB 204 may drive the antenna arrays 208 to transmit signals with reduced RF interconnection components (e.g., which may reduce cost, improve performance, and/or provide for simpler construction).

In some examples, the planes of the first antenna array 208A may be positioned vertically and the planes of the second antenna array 208B may be positioned horizontally (e.g., at least one plane of first antenna array 208A may be perpendicular to at least one plane of second antenna array 208B). In some examples, the planes of the first antenna array 208A may be positioned in a substantially perpendicular direction to the planes of the second antenna array 208B. For example, substantially perpendicular may be +/−5 degrees of being perpendicular. Positioning the respective planes 214 of an antenna array 208, such as the first antenna array 208A or the second antenna 208B, horizontally or vertically may change a direction a beam is transmitted by the respective antenna array 208. Accordingly, a direction a beam may be transmitted by a respective antenna array 208 may be manipulated by the alignment of the positioning of the planes of the antenna array 208, such as the planes being horizontally aligned or vertically aligned. In some examples, the planes 214 of an antenna array 208 being horizontally aligned would have the planes 214 aligned to extend in the z-direction and y-direction, as shown in FIG. 2. In some examples, the planes 214 of an antenna array 208 being vertically aligned would have the planes 214 aligned to extend in the x-direction and z-direction, as shown in FIG. 2.

In the example as shown FIG. 2, second antenna array 208B may be a back transmitting array that is configured to transmit signals in back direction 220B and first antenna array 208A may be a side transmitting antenna array that is configured to transmit signals in a side direction 220A. In some examples, one or more of the first antenna array 208A or the second antenna array 208B may be positioned on the MLB. In some examples, one or more of the first antenna array 208A or the second antenna array 208B may be positioned directly on the MLB. In some examples, one or more of the first antenna array 208A or the second antenna array 208B may be soldered on MLB 204.

The first antenna array 208A positioned on MLB 204 may be configured to transmit signals in a first direction while the second antenna array 208B positioned on MLB 204 may be configured to transmit signals in a second direction, the second direction being different than the first direction. In some examples, the second direction may be substantially perpendicular to the first direction. For example, substantially perpendicular may be +/−5 degrees of being perpendicular.

Figure 3A:
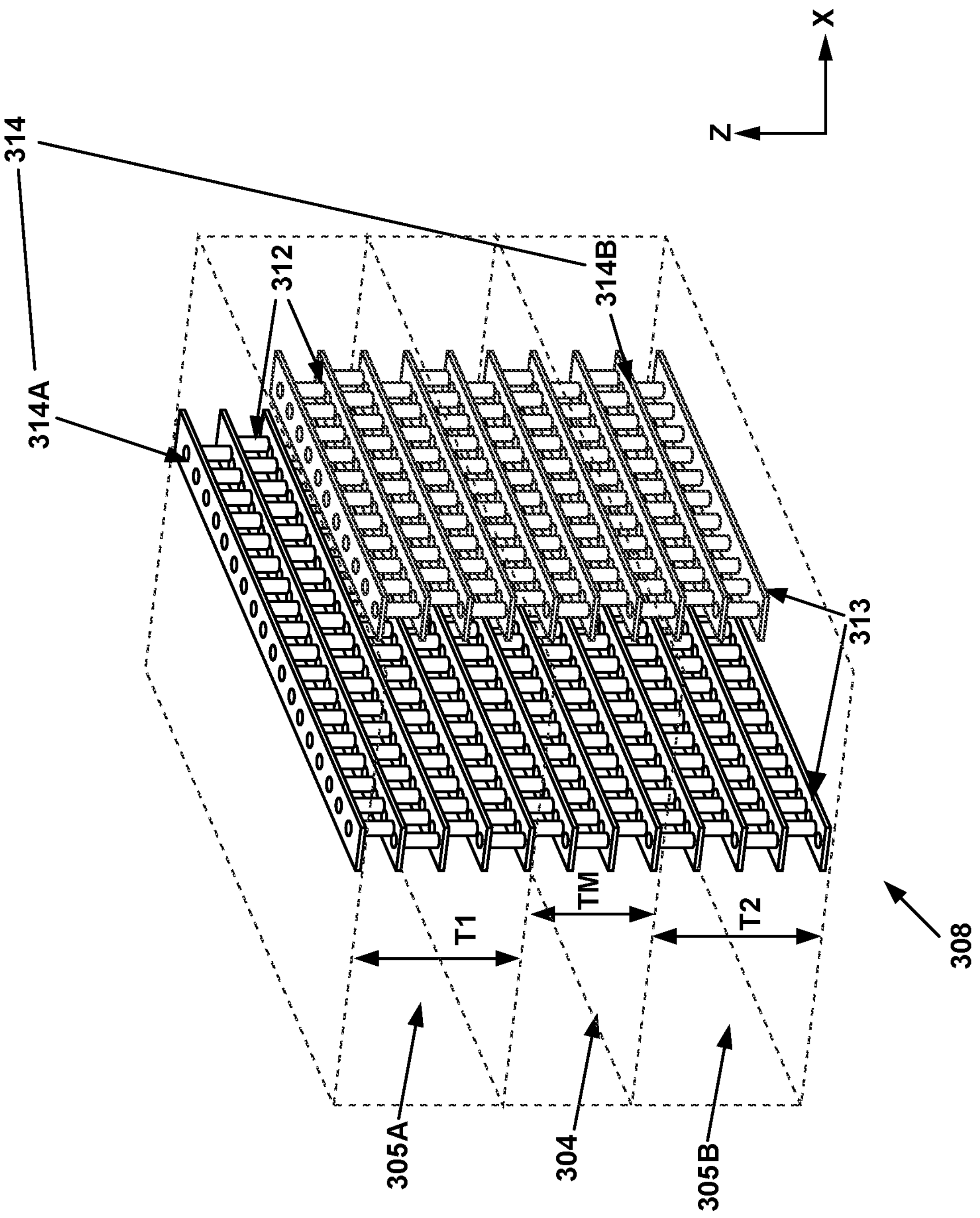
FIGS. 3A-3C are views of a meshed patch structure, in accordance with one or more aspects of this disclosure.
Figure 3B:
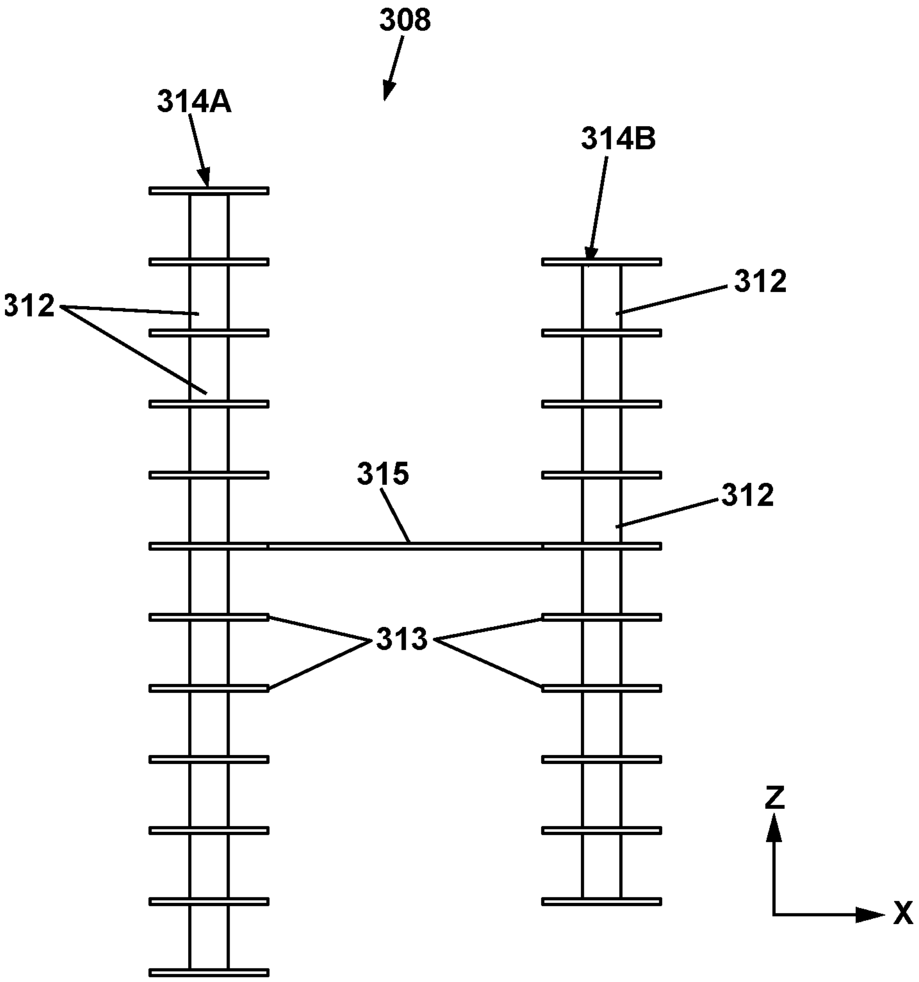
Figure 3C:
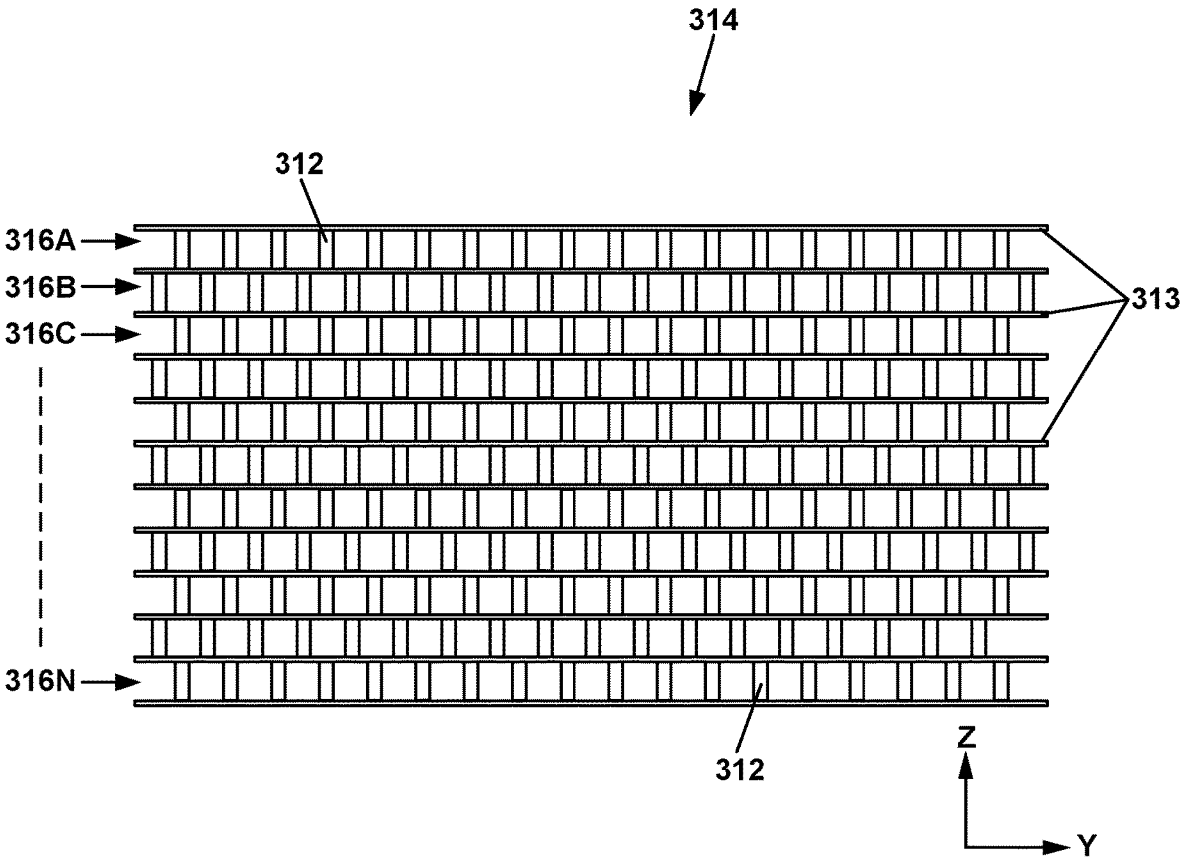

MLB 304 of FIGS. 3A-3C is one example of MLB 104 shown in FIG. 1, antenna array 308 of FIGS. 3A-3C is one example of a first antenna array 108A and/or second antenna array 108B shown in FIG. 1. Planes 314 of FIGS. 3A-3C is one examples of planes 214 shown in FIG. 2, ground plane 314A of FIGS. 3A-3C is one example of ground plane 214A shown in FIG. 2, and patch plane 314B of FIGS. 3A-3C is one example of patched plane 214B shown in FIG. 2. First substrate 305A of FIGS. 3A-3C is one example of first substate 205A shown in FIG. 2 and second substrate 305B of FIGS. 3A-3C is one example of second substate 205B shown in FIG. 2.

In some examples, the ground plane 214A may be aligned at a nonparallel angle with respect to the respective patch plane 214B. In some examples, the one or more planes 214 may comprise a thin metal, such as, copper, galvanized steel or aluminum.

One or more of the planes 314 of the first antenna array 308A and/or one or more of the planes 314 of the second antenna array 308B may include a meshed patch structure that includes a plurality of vias 312 and traces 313 arranged in a mesh-like structure, as shown in FIGS. 3A-3C. In some examples, the plurality of traces 313 may be soldered on MLB 304. In some examples, one or more of the planes 314 of the first antenna array 308A and/or one or more of the planes 314 of the second antenna array 308B including a meshed patch structure, such as when second antenna array 308B is configured as a side transmitting array, may enable the first antenna array 308A and the second antenna array 308B to use IC 306 instead of each antenna array having a dedicated phase array IC and cables.

MLB 304 is one example of MLB 104 shown in FIG. 1, antenna array 308 is one example of a first antenna array 308A and/or second antenna array 308B shown in FIG. 1. Planes 314 is one examples of planes 214 shown in FIG. 2, ground plane 314A is one example of ground plane 214A shown in FIG. 2, and patch plane 314B is one example of patched plane 214B shown in FIG. 2.

FIG. 3A is a schematic perspective view of an example configuration of an antenna array 308, such as the first antenna array 108A and/or the second antenna array 308B. In some examples, the antenna array 308 may include one or more planes 314. The antenna array 308 includes a ground plane 314A and a patched plane 314B. A plane, 314, such as ground plane 314A or a patched plane 314B, may include a plurality of traces 313 and a plurality of vias 312 (e.g., spaces, holes, and/or through holes) arranged between the respective traces 313 to form the meshed patch structure. For example, drilling a board, such as an aluminum or copper board, of a plane 314 forms through holes to generate the vias 312 of a plane 314. In some examples, the drilled through holes (e.g., vias 312) may be coated with a conductive material. In some examples, one or more the plurality of vias 312 may provide an electrical connection between traces 313 of a respective plane 314. For example, the ground plane 314A may include a plurality of traces 313 and a plurality of vias 312 arranged between the respective traces 313 to form the meshed patch structure of the ground plane 314A. For example, the patched plane 314B may include a plurality of traces 313 and a plurality of vias 312 arranged between the respective traces 313 to form the meshed patch structure of the patched plane 314B.

FIG. 3A further shows an example configuration of an antenna array 308, such as the first antenna array 308A and/or the second antenna array 108B, with respect to the MLB 304. FIG. 3A shows a first substrate 305A on a first side (e.g., above) of the MLB 304 and a second substrate 305B on a second side (e.g., below) of the MLB 304. In some examples, one or more of first substrate 305A and/or second substrate 305B may be a high frequency PCB, such as a Rogers™ PCB. In some examples, first substrate 305A may be the same, similar or different than second substrate 305B. In some examples, the MLB 304 may be a laminated circuit board, such as an FR4 type board or polytetrafluoroethylene (PTFE) board. As such, in some examples, the MLB 304 may comprise a different material than the first substrate 305A and the second substrate 305B. In other examples, MLB 304 and one or both of first substrate 305A and second substrate 305B may be comprise a same material. In some examples, the ground plane 314A and/or patched plane 314B may be positioned on the MLB 304, the first substrate 305A, and the second substrate 305B.

As shown in FIG. 3A, MLB 304, substrate 305A, and substrate 305B respectively have thicknesses TM, T1, and T2. In some examples, thicknesses T1 and T2 may be equal to each other. In other examples, thickness T1 may be different than thickness T2. In some examples, a thickness T1 of first substrate 305A and/or a thickness T2 of the second substrate 305B may be greater than a thickness TM of the MLB 304. Utilizing one or more substrates (i.e., substrate 305A and/or 305B) with thicknesses greater than the thickness of MLB 304 may provide various advantages. As one example, such an arrangement may enable antenna array 308B to be sized for a desired wavelength without unduly increasing the thickness TM of MLB 304.

FIG. 3B is a schematic side view of an example configuration of an antenna array 308, such as the first antenna array 308A and/or the second antenna array 308B. The antenna array 308 includes a ground plane 314A and a patched plane 314B. The ground plane 314A and the patched plane 314B of the antenna array 308 each respectively include a plurality of traces 313 and a plurality of vias 312 arranged between the respective traces 313. The antenna array may include a connector 315 that connects the ground plane 314A and the patched plane 314B. In some examples, the antenna array 308 may include a plurality of connectors 315.

FIG. 3C is a schematic front or rear view of an example configuration of a plane 314 of an antenna array 308, such as the first antenna array 308A and/or the second antenna array 308B. The plane 314 shown in FIG. 3C may be an example of a ground plane 314A and/or a patched plane 314B of the antenna array 308. The plane 314 includes a plurality of traces 313 and a plurality of vias 312 arranged between the respective traces 313. In some examples, a plane 314 may include a plurality of rows 316A, 316B . . . 316N of vias 312 with traces 313 arranged between the respective rows of vias 312. A row 116, such as any of rows 316A, 316B . . . 316N, may include one or more traces 313 and one or more vias 312. In some examples, the vias 312 of a particular row, such as row 316A, may be arranged in an off-set position from the vias 312 in a neighboring row, such as row 316B. In some examples, the vias 312 of a plane 314 may be arranged in a grid like fashion. In some examples, the vias 312 of a particular row, such as row 316A, may be arranged in an off-set position from the vias 312 in a neighboring row, such as row 316B, but arranged to correspond to the arrangements of the vias 312 of an alternating row, such as row 316C, as shown in FIG. 3C. In some examples, a plane 314 may include a plurality of traces 313. One or more of the rows 316 may have a trace 313 on top and on the bottom of a particular row. In some examples, a trace 313 may serve as a bottom trace for a particular row, but serve as a top trace for a neighboring row. For example, a trace 313 may serve as a bottom trace for row 316B and a top trace for row 316C.

The planes 314 of an antenna array 308 having a meshed patch structure including a plurality of traces 313 and a plurality of vias 312, such as shown in FIGS. 3A-3C, may enable a plurality of antenna arrays to use the same IC to drive the transmission of signals (e.g., as opposed to using a dedicated phase array IC and cables for each respective antenna array). In this way, the planes 314 of an antenna array 308 having a meshed patch structure may reduce insertion losses, enhance coverage and/or reduce costs to produce a mobile computing device.

Aspects of this disclosure include the following examples.

Example 1; A mobile computing device includes a main logic board (MLB); a first antenna array positioned on the MLB and configured to transmit signals in a first direction, the first antenna array comprising one or more planes; and a second antenna array positioned on the MLB and configured to transmit signals in a second direction, the second direction being different than the first direction, the second antenna array comprising one or more planes and the second direction being different than the first direction, wherein at least one of the one or more of the planes in the first antenna array or at least one of the one or more of the planes in the second antenna array comprises a meshed patch structure.

Example 2: The mobile computing device of example 1, wherein the meshed patch structure includes a plurality of vias and a plurality of traces arranged in a mesh structure.

Example 3: The mobile computing device of any of examples 1-2, the mobile computing device further comprises one or more of: a first substrate positioned on a first side of the MLB; and a second substrate positioned on a second side of the MLB, wherein the first antenna array is positioned on the MLB and one or more of the first substrate and the second substrate.

Example 4: The mobile computing device of example 3, wherein vias of the meshed patch structure are respectively positioned amongst the MLB and at least one of the first substrate and the second substrate.

Example 5: The mobile computing device of any of examples 3-4, wherein at least one of the first substrate or the second substrate is a high frequency printed circuit board.

Example 6: The mobile computing device of any of examples 1-5, further comprising an integrated circuit (IC) positioned on the MLB, wherein the IC drives transmission of the signals from the first antenna array and the second antenna array.

Example 7: The mobile computing device of example 6, wherein the IC is connected to the first antenna array and the second antenna array without intervening cables.

Example 8: The mobile computing device of any of examples 1-7, wherein the first direction is substantially perpendicular to the second direction.

Example 9: The mobile computing device of any of example 1-8, wherein each of the one or more planes in the first antenna array or each of the one or more planes in the second antenna array comprises the meshed patch structure.

Example 10: The mobile computing device of any of example 1-9, wherein the one or more planes comprises a ground plane and a patched plane.

Example 11: The mobile computing device of example 10, wherein the ground plane is aligned at a nonparallel angle with respect to the patched plane.

Example 12: The mobile computing device of any of example 1-10, wherein each of the one or more planes in the first antenna array and each of the one or more planes in the second antenna array comprises the meshed patch structure.

Example 13: The mobile computing device of any of examples 1-12, wherein the first antenna array includes a respective ground plane and a respective patched plane, and wherein each of the respective ground plane and the respective patched plane includes a plurality of vias and a plurality of traces arranged in a mesh structure.

Example 14: The mobile computing device of any of examples 1-13, wherein the first antenna array includes a connector connecting a ground plane to a patched plane.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structures suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Various aspects have been described in this disclosure. These and other aspects are within the scope of the following claims.

The invention claimed is:

1. A mobile computing device comprising:

a main logic board (MLB);

a first substrate positioned on a first side of the MLB;

a second substrate positioned on a second side of the MLB;

a first antenna array positioned on the MLB and configured to transmit signals in a first direction, the first antenna array comprising one or more planes; and a second antenna array positioned on the MLB and configured to transmit signals in a second direction, the second direction being different than the first direction, the second antenna array comprising one or more planes and the second direction being different than the first direction, wherein at least one of the one or more of the planes in the first antenna array comprises a meshed patch structure that includes a plurality of vias and a plurality of traces arranged in a mesh structure wherein vias of the meshed patch structure are respectively positioned amongst the MLB, the first substrate, and the second substrate.

2. The mobile computing device of claim 1, wherein at least one of the first substrate or the second substrate is a high frequency printed circuit board.

3. The mobile computing device of claim 1, further comprising an integrated circuit (IC) positioned on the MLB, wherein the IC drives transmission of the signals from the first antenna array and the second antenna array.

4. The mobile computing device of claim 3, wherein the IC is connected to the first antenna array and the second antenna array without intervening cables.

5. The mobile computing device of claim 1, wherein the first direction is substantially perpendicular to the second direction.

6. The mobile computing device of claim 1, wherein each of the one or more planes in the first antenna array or each of the one or more planes in the second antenna array comprises the meshed patch structure.

7. The mobile computing device of claim 1, wherein the one or more planes of the first antenna array comprises a ground plane and a patched plane.

8. The mobile computing device of claim 7, wherein the ground plane is aligned at a nonparallel angle with respect to the patched plane.

9. The mobile computing device of claim 1, wherein each of the one or more planes in the first antenna array and each of the one or more planes in the second antenna array comprises a respective meshed patch structure.

10. The mobile computing device of claim 1, wherein the first antenna array includes a respective ground plane and a respective patched plane, and wherein each of the respective ground plane and the respective patched plane includes a plurality of vias and a plurality of traces arranged in a mesh structure.

11. The mobile computing device of claim 1, wherein the first antenna array includes a connector connecting a ground plane to a patched plane.

* * * * *